United States Patent [19]

Shimanuki et al.

[11] 4,348,131
[45] Sep. 7, 1982

[54] WELDED STRUCTURE HAVING IMPROVED MECHANICAL STRENGTH AND PROCESS FOR MAKING SAME

[75] Inventors: Shizuka Shimanuki; Toshimi Matsumoto; Hiroshi Sato; Tsutomu Onuma; Seishin Kirihara, all of Hitachi, Japan

[73] Assignee: Hitachi, Ltd., Tokyo, Japan

[21] Appl. No.: 147,329

[22] Filed: May 6, 1980

[30] Foreign Application Priority Data

May 9, 1979 [JP] Japan .................. 54-55759

[51] Int. Cl.³ ................................. B23K 9/23
[52] U.S. Cl. .................. 403/272; 219/137 WM; 403/28; 403/38; 403/271
[58] Field of Search .................. 219/137 R, 137 WM; 403/270–272, 28, 30

[56] References Cited

U.S. PATENT DOCUMENTS

| | | | |
|---|---|---|---|
| 1,959,791 | 5/1934 | Kautz | 219/137 WM |
| 2,819,517 | 1/1958 | Pursoll | 219/137 R |
| 3,351,734 | 11/1967 | Arikawa | 219/137 WM |
| 4,013,868 | 3/1977 | Koshiga | 219/137 WM |

Primary Examiner—Elliot A. Goldberg
Attorney, Agent, or Firm—Thomas E. Beall, Jr.

[57] ABSTRACT

A welded structure and a method for making same wherein a plurality of weld metals, such as martensitic steel and austenitic steel, differing in coefficient of thermal expansion from each other are deposited in a plurality of layers thicknesswise of the welded structure in a gap defined by structural members to be welded in such a manner that a layer of the weld metal of higher coefficient of thermal expansion is covered by a layer of the weld metal of lower coefficient of thermal expansion in a weld formed, to improve brittle fracture strength, fatigue strength and stress corrosion cracking resistance of the weld. By subjecting the welded structure to stress relief annealing treatment, it is possible to produce compressive stress on the surface of the layer of the weld metal of lower coefficient of thermal expansion.

12 Claims, 19 Drawing Figures

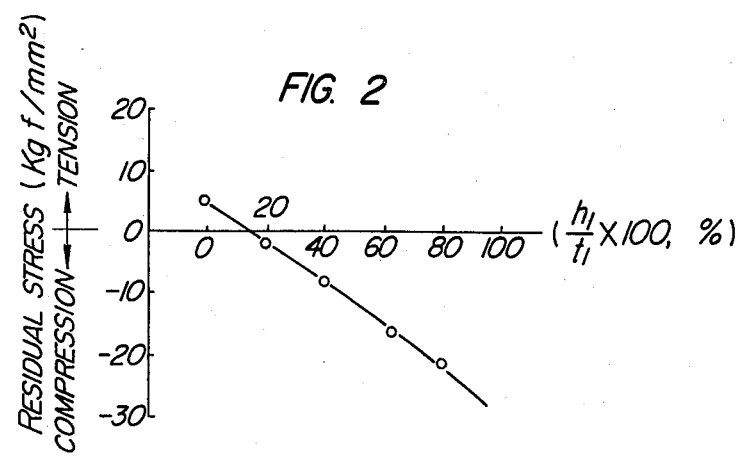
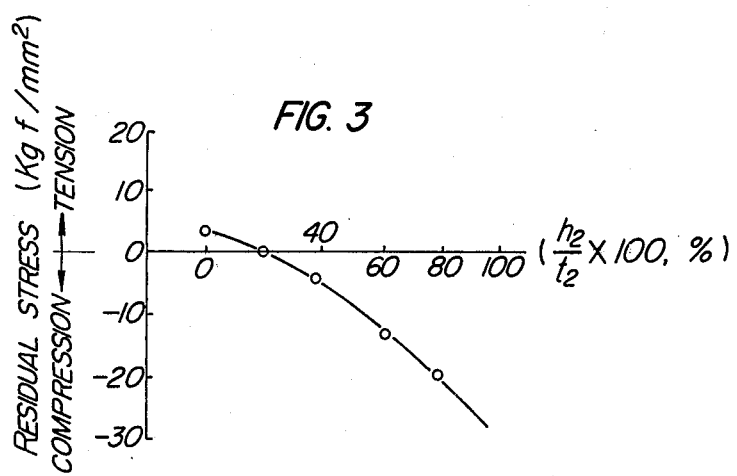

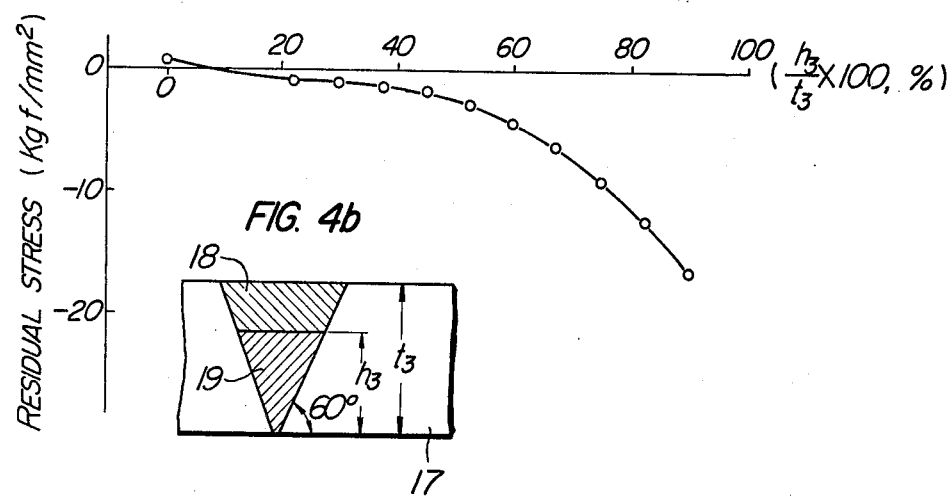
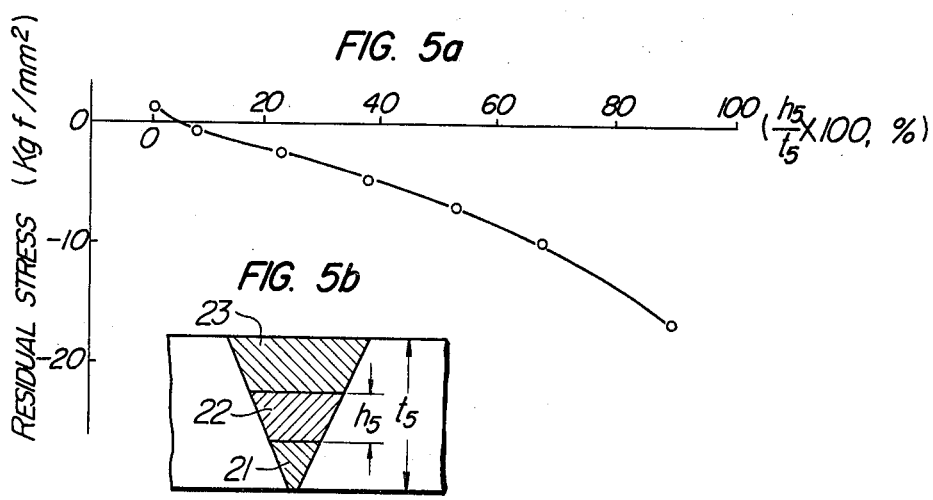

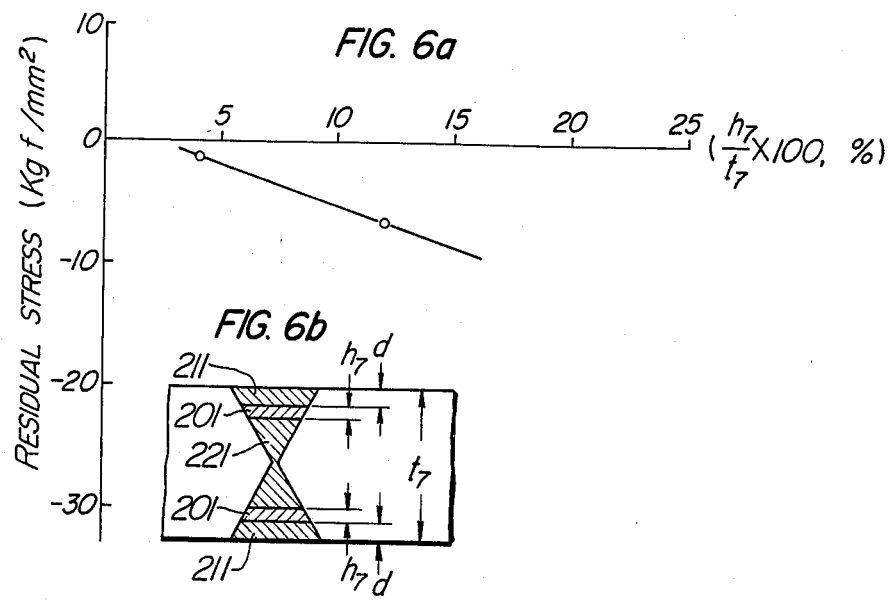
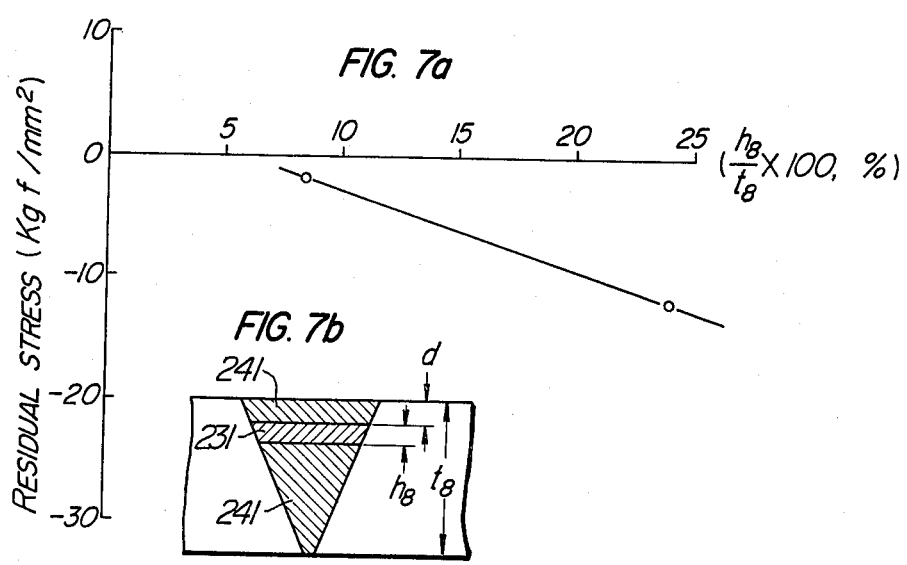

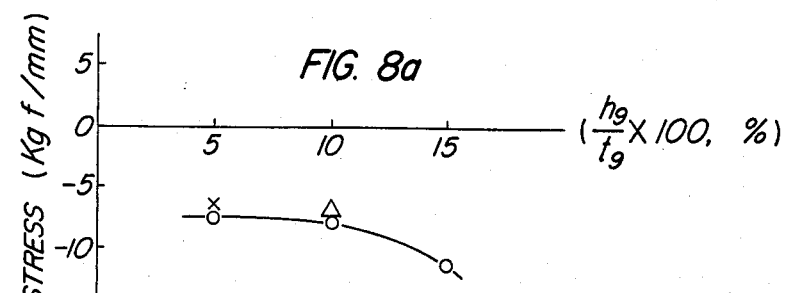
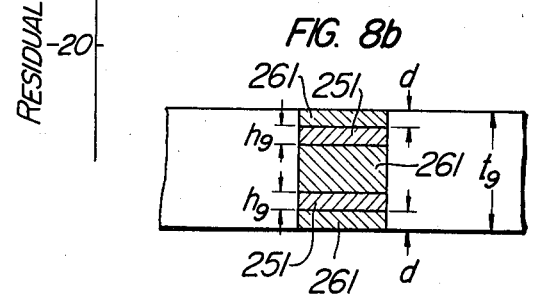
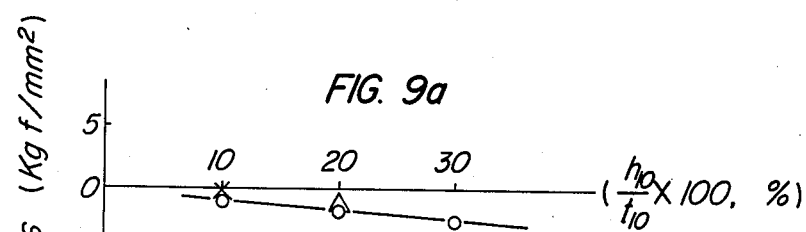
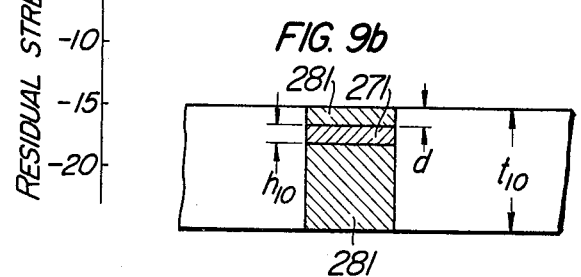

WELDED STRUCTURE HAVING IMPROVED MECHANICAL STRENGTH AND PROCESS FOR MAKING SAME

BACKGROUND OF THE INVENTION

This invention relates to a welded structure capable of having its mechanical strength, such as brittle rupture strength, fatigue strength, etc., improved by reducing welding residual stress by means of stress relief annealing treatment, a welded structure having its mechanical strength improved by the aforesaid treatment, and a process for making same.

In welded structures, particularly welded steel structures, tensile residual stress tends to be produced in butt welds, T-joints and fillet welds after welding. It is usual practice to remove or alleviate such residual stress by subjecting the welded structures to stress relief annealing treatment.

The stress relief annealing treatment is carried out in order to improve the strength of a welded structure by alleviating tensile stress and improving the microstructure of the welding heat affected zone. The welded structure is usually kept at a temperature tending to cause transformation of steel from $\alpha$ to $\gamma$ and vice versa (preferably in the range between 600° and 650° C.) for about one (1) hour per one (1) inch of the thickness of the welded structure, and then slowly cooled to about 300° C. or below that level (particularly at a cooling rate of less than 50° C. per hour and preferably by furnace cooling). Materials capable of having their residual stresses relieved by annealing include carbon steel, low alloy steel and stainless steel (high alloy steel).

In joining structural members by welding, it is common practice to deposit a weld metal of the same type as the metal of the structural members to provide a defect-free weld to the welded structure. Thus the structural members to be welded and the weld metal used in welding have substantially the same coefficient of thermal expansion. Because of this, when the weld (including the welding heat affected zone) of the welded structure is subjected to stress relief annealing treatment, residual tensile stress would develop on the surface of the weld metal although such residual stress is less than 10 kg/mm² in magnitude. The mechanism of development of such residual tensile stress would be that the welded structure including the weld would undergo thermal expansion when it is heated and tensile stress would remain on the surface of the weld metal which is restrained by the welded portion of the welded structure when the latter is cooled. The tensile stress that remains would, of course, be less than one third to one fourth in magnitude of the tensile stress which would be present on the surface of the weld metal when no stress relief annealing treatment is performed. Nevertheless, there is the risk that brittle fracture and fatigue fracture would occur in the weld that has been subjected to stress relief annealing treatment, and such weld would be susceptible to stress corrosion cracking while in service.

SUMMARY OF THE INVENTION

This invention has as its object the provision of a welded structure having improved mechanical strength and a method for making same, wherein compressive stress is applied to the surface of the weld metal to improve the brittle fracture strength and fatigue strength of the weld of the welded structure and to increase the resistance thereof to stress corrosion cracking.

To accomplish the aforesaid object, the invention provides a welded structure having a plurality of layers of a weld metal of higher coefficient of thermal expansion and a weld metal of lower coefficient of thermal expansion suitably superposed one over another, such welded structure being subjected to stress relief annealing treatment to apply compressive stress to the surface of the uppermost layer of the weld metal.

More specifically, the welded structure according to the invention comprises a plurality of layers of weld metals deposited in a zone defined by the welded portion of the welded structure in such a manner that the weld metals are restrained by the welded portion, the plurality of layers of weld metals comprising at least one layer of a first weld metal and at least one layer of a second weld metal contiguous to the layer of the first weld metal, the second weld metal being higher in coefficient of thermal expansion than the first weld metal having at least one exposed surface in the aforesaid zone.

The invention can have application in welding of structural members by forming butt welds of the I-, U-, V-, K-, X- and Y-types, T-joints and a fillet weld. The results of experiments show that the invention can be most advantageously worked in producing a welded structure by butt welding. According to the principle of the invention, the layer or layers of the first weld metal and the layer or layers of the second weld metal should be superposed one over another thicknesswise of the structural members to be welded, and the latter should be covered with the former at least on one side of the welded portion.

Additional and other objects, features and advantages of the invention will become apparent from the description set forth hereinafter when considered in conjunction with the accompanying drawings.

BRIEF DESCRIPTION OF THE DRAWINGS

FIGS. 2 and 3 are graphs showing the relation between the residual stress present on the surface of the weld metal and the cross-sectional shape of the weld in butt welds of the I-type and X-type respectively;

FIGS. 4a–9a are graphs showing the relation between the residual stress present in the weld and the cross-sectional shape of the weld in various types of welds; and FIGS. 4b–9b are sectional views of various types of welds used for obtaining the data shown in the graphs in FIGS. 4a–9a respectively.

DESCRIPTION OF THE PREFERRED EMBODIMENTS

Figure 1A:
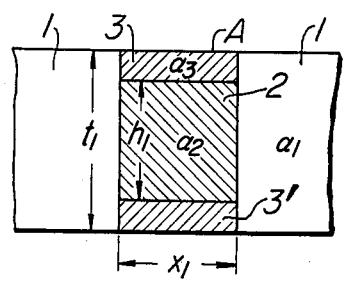
FIGS. 1a–1e are sectional views of welds showing examples of joints to which the invention can be applied.
Figure 1B:
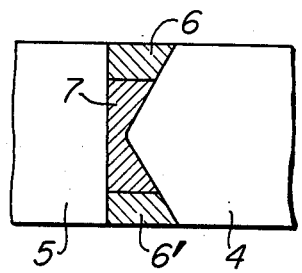
Figure 1C:
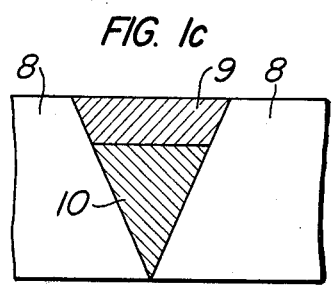
Figure 1D:
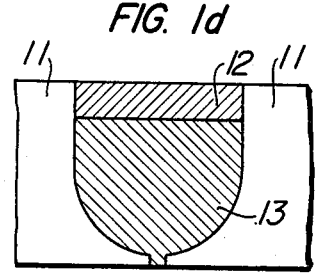

The invention can have application in various types of butt welds. Some examples of application of the invention are shown in FIGS. 1a–1e. FIG. 1a shows a butt weld of the I-type produced by the invention. In producing such butt weld, structural members 1 and 1 of a thickness $t_1$ having a coefficient of thermal expansion $\alpha_1$ are arranged in spaced-apart juxtaposed relation with their sides defining an I-shaped gap of a size $x_1$ in which a layer 3' of a first weld metal having a coefficient of thermal expansion $\alpha_3$ is first formed by deposition, followed by a layer 2 of a height $h_1$ of a second weld metal having a coefficient of thermal expansion $\alpha_2$ deposited on the layer 3' of the first weld metal and by a layer 3 of the first weld metal deposited on the layer 2 of the second weld metal. When the butt weld produced in this way is subjected to stress relief annealing treatment, the second weld metal 2 having a higher coefficient of thermal expansion shows greater thermal expansion than the first weld metal 3, 3' having a lower coefficient of thermal expansion. Cooling of the weld heated as aforesaid results in the weld metal of higher coefficient of thermal expansion showing greater shrinkage. The shrinkage of the weld metals applies a compressive force on the first weld metal 3 so that residual compressive stress is developed on an exposed surface A of the first weld metal 3.

FIGS. 1b, 1c, 1d and 1e show butt welds of the K-type, V-type, U-type and X-type produced by the method according to the invention. In these butt welds, a layer 7, 10, 13, 16 of the second weld metal of higher coefficient of thermal expansion has a layer or layers 6, 6', 9, 12, 15, 15' of the first weld metal of lower coefficient of thermal expansion superposed one over another, and the welds are subjected to stress relief annealing treatment to produce compressive stress on the exposed surface of the first weld metal. The coefficient of thermal expansion of the structural members 1, 4, 5, 8, 11, 14 to be welded is not determined by the relation between the coefficient of thermal expansion of the first weld metal and that of the second weld metal. However, when considered from the point of view of steel material and its welding in general, it is usually the case that the first weld metal has substantially the same coefficient of thermal expansion as the structural members to be welded or the structural members to be welded and the first weld metal are materials of the same type.

The compressive force applied to the first weld metal may vary in magnitude depending on the difference between the first and second weld metals in coefficient of thermal expansion or on other factors. In steel materials, martensitic steel has a coefficient of thermal expansion of about $11-13 \times 10^{-6}/°C$. and austenitic steel has a coefficient of thermal expansion of about $16-19 \times 10^{-6}/°C$. The use of two weld metals of the same type differing only slightly from each other in coefficient of thermal expansion to be superposed in layers has little effect in accomplishing the object of the invention. For practical purposes, the second weld metal is preferably higher in coefficient of thermal expansion than the first weld metal by over $1 \times 10^{-6}/°C$., or more preferably by over $2 \times 10^{-6}/°C$.

Another factor that exerts a great influence on the production of residual compressive stress is the ratio of the cross-sectional area of the first weld metal layer to that of the second weld metal layer or the ratio of the thickness of the first weld metal layer to that of the second weld metal layer deposited in layers in the gap defined by the sides of the structural members to be welded. To cause the influence of the second weld metal layer to manifest itself on the exposed surface of the first weld metal layer requires that the cross-sectional area of the second weld metal layer or the thickness thereof is over a predetermined value. Such value may vary depending on the material of the structural members to be welded, the types of the first and second weld metals, the shape of the gap defined between the sides of the structural members, conditions for effecting stress relief annealing treatment, and other factors. However, it is possible to provide a specific area ratio (or thickness ratio) best serving the purpose by utilizing the information provided by the invention in each application.

FIG. 2 shows the relation between the stress produced in the weld on one hand, and the thickness of the second weld metal layer and the thickness of the structural members to be welded on the other hand in the butt weld shown in FIG. 1a. FIG. 3 shows the relation between the stress produced in the weld on one hand, and the thickness of the second weld metal layer and the thickness of the structural members to be welded on the other hand in the butt weld shown in FIG. 1e. It will be seen that by increasing the ratio of the thickness $h_1$ ($h_2$) of the second weld metal layer to the thickness $t_1$ ($t_2$) of the structural members to be welded, it is possible to increase the compressive stress produced on the exposed surface of the first weld metal layer.

Figure 1E:
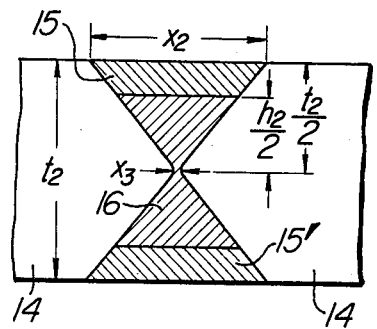

In FIG. 1a, the thickness $t_1$ of the structural members to be welded was 100 mm, and the gap $x_1$ defined by the sides of the structural members to be welded was 25 mm. In FIG. 1e, $t_2$ was 100 mm, $x_3$ was 5 mm and $x_2$ was 60 mm. Table 1 shows the chemical compositions of the structural members to be welded and the weld metals, and Table 2 shows the mechanical properties and coefficients of thermal expansion thereof.

Welding was carried out by an arc welding process with covered electrode, under the conditions of a preheating temperature of 150° C., an interpass temperature of 150° C. and a thermal input of 18,000 J/cm.

In producing an X-type butt weld, the second weld metal (austenitic weld metal) was deposited by building-up welding on opposite sides of the root gap for a thickness of $h_2/2$ on each side as shown in FIG. 1e. Then, the first weld metal (martensitic weld metal) was applied to deposit the first weld metal layers 15 and 15' on opposite sides of the second weld metal layer 16.

In producing an I-type butt weld, a backing strip, not shown, was used to form the first weld metal layer (martensitic weld metal) 3' first of all as shown in FIG. 1a. Then, the second weld metal layer (austenitic weld metal) 2 was formed over the first weld metal layer 3', and finally the first weld metal layer 3 was formed on the second weld metal layer 2. In the welded structures shown in FIGS. 1a and 1e, the first and second weld metal layers were designed to be symmetrical thicknesswise of the structural members to be welded. Such symmetrical arrangement of the weld metal layers is advantageous in minimizing bending deformation of the welds in most cases. To this end, the symmetrical arrangements shown in FIGS. 1a, 1b, 1e, 6b and 8b are preferable.

TABLE 1

| | Material | Chemical Composition (%) | | | | | | | |
| --- | --- | --- | --- | --- | --- | --- | --- | --- | --- |
| | | | C | Si | Mn | P | S | Ni | Cr | Mo |
| Structural members | Martensitic | 0.14 | 0.45 | 0.48 | 0.032 | 0.008 | 6.03 | 12.21 | — |
| Second Weld Metal | Austenitic | 0.05 | 0.48 | 1.47 | 0.021 | 0.009 | 12.79 | 21.87 | 2.01 |
| First Weld | | | | | | | | | |

TABLE 1-continued

|  | Material | \multicolumn{7}{c}{Chemical Composition (%)} |
|---|---|---|---|---|---|---|---|---|---|
|  |  | C | Si | Mn | P | S | Ni | Cr | Mo |
| Metal | Martensitic | 0.06 | 0.34 | 0.50 | 0.028 | 0.010 | 5.10 | 12.32 | — |

TABLE 2

| Material | | Mechanical Properties | | Coefficient of Thermal Expansion (°C.$^{-1}$) |
|---|---|---|---|---|
|  |  | Yield Strength (kg f/mm$^2$) | Tensile Strength (kg f/mm$^2$) |  |
| Structural Members | Martensitic | 70.2 | 85.3 | $12 \times 10^{-6}$ |
| Second Weld Metal | Austenitic | 59.4 | 68.1 | $17 \times 10^{-6}$ |
| First Weld Metal | Martensitic | 73.1 | 88.4 | $12 \times 10^{-6}$ |

The butt weld joints produced as described hereinabove were subjected to stress relief annealing treatment for three (3) hours at 600° C., following welding. Thereafter, the residual stress present on the surface of the first weld metal layer 3 (6, 9, 11 and 15) was measured by using a wire resistance strain gauge.

In FIGS. 2 and 3, it will be seen that in the embodiments described hereinabove compressive stress is produced on the surface of the first weld metal layer when the dimension (indicated by a length thereof thicknesswise of the structural members to be welded) of the second weld metal layer is over 20% of the thickness of the structural members to be welded. If the dimension of the second weld metal layer is kept constant, then the volume (area) of the second weld metal layer is smaller in the X-type butt weld than in the I-type butt weld.

Thus it is necessary to slightly increase the dimension of the second weld metal layer when an X-type butt weld is produced.

Meanwhile structural members formed of inconel and carbon steel were welded by the welding method according to the invention, and the welded structure obtained was tested for mechanical properties. Welding was performed manually at room temperature with a thermal input of 15000 J/cm. A weld metal of the austenitic steel (See Table 3) was first deposited by building-up welding on opposite sides of the center of the thickness of the structural members which were plates, and then another weld metal (inconel) having the same coefficient of thermal expansion as the plates (See Table 3) was deposited by building-up welding on the layer of the weld metal of the austenitic steel. In this example, the height of the layer of the weld metal of the austenitic steel was 20% of the plate thickness in the embodiment shown in FIG. 1a and 40% thereof in the embodiment shown in FIG. 1e.

Following welding, the welded structure obtained was subjected to stress relief annealing treatment at 600° C. for three (3) hours. Residual stress was measured by means of a wire resistance strain gauge on the surface and the undersurface of the plate. Table 3 shows the chemical compositions of the plates and the weld metals, and Table 4 shows the mechanical properties thereof.

TABLE 3

| Material | | \multicolumn{9}{c}{Chemical Composition (%)} |
|---|---|---|---|---|---|---|---|---|---|---|
|  |  | C | Si | Mn | P | S | Ni | Cr | Mo | Nb |
| Structural Members | Steel | 0.19 | 0.015 | 0.56 | 0.02 | 0.019 | — | — | — | — |
|  | Inconel | 0.05 | 0.20 | 0.20 | — | — | 76.6 | 15.8 | — | — |
| Second Weld Metal | Austenitic | 0.05 | 0.48 | 1.47 | 0.021 | 0.009 | 12.79 | 21.87 | 2.01 | — |
| First Weld Metal | Inconel | 0.05 | 0.70 | 7.0 | — | — | 67.2 | 14.6 | 0.04 | 1.6 |

TABLE 4

| Material | | Mechanical Properties | | Coefficient of Thermal Expansion (°C.$^{-1}$) |
|---|---|---|---|---|
|  |  | Yield Strength (kg f/mm$^2$) | Tensile Strength (kg f/mm$^2$) |  |
| Structual Members | Steel | 33.5 | 48.7 | $11.6 \times 10^{-6}$ |
|  | Inconel | 32.4 | 56.5 | $13.5 \times 10^{-6}$ |
| Second Weld Metal | Austenitic | 59.4 | 68.1 | $17 \times 10^{-6}$ |
| First Weld Metal | Inconel | 73.1 | 88.4 | $13.5 \times 10^{-6}$ |

Table 5 shows the results of tests for measuring the residual stress. In Table 5, it will be seen that residual compressive stress of below zero can be produced if, in the example shown in Table 3, the thickness of the weld metal of the austenitic steel is 20% the thickness of the plates in the case of a butt weld of the I-type and 40% thereof in the case of a butt weld of the X-type.

TABLE 5

| Structural Members | I-Type (X = 20%) | X-Type (X = 40%) |
| --- | --- | --- |
| | Residual Stress (kg f/mm$^2$) | |
| Martensitic Steel | −3 | −2 |
| Steel | −6 | −5 |
| Inconel | −4 | −3 |

X: Height of Second Weld Metal Layer Relative to Plate Thickness.

FIG. 4a shows residual stress present in a butt weld of the V-type (included angle=60°) shown in FIG. 4b in relation to cross-sectional shape of the weld. In producing the butt weld of the V-type shown in FIG. 4b, the martensitic steel shown in Table 1 was used to provide the first weld metal layer and the austenitic steel shown in Table 1 was used to provide the second weld metal layer to weld plates 17. The welding method, the stress relief annealing treatment and the residual stress measuring method described hereinabove were used in the example shown in FIGS. 4a and 4b. In the examples described hereinafter, welding, stress relief annealing and residual stress measuring were carried out under similar conditions. In FIG. 4a, it will be seen that compressive stress is produced when the ratio h$_3$/t$_3$ exceeds 20%. However, the tendency of increase is not so marked as in FIGS. 2 and 3. The phenomenon would be attributed to the fact that since the cross-sectional shape of the weld of FIG. 4b is asymmetrical with respect to the direction of thickness of the plate, bending stress would be produced in the weld and would cause a reduction in the compressive stress to be produced.

FIG. 5a shows the results of tests in which residual stress was measured on the weld shown in FIG. 5b in the same manner as described hereinabove with reference to other examples. A tendency similar to that shown in FIG. 4a can be seen in FIG. 5a. In FIG. 5b, a second weld metal layer 22 is interposed between two first weld metal layers 21 and 23.

FIG. 6a shows compressive stress produced in the butt weld shown in FIG. 6b in which a second weld metal layer 201 is only formed near the surface of a first weld metal layer 211 and another first weld metal layer 221 of the same material as the first weld metal layer 211 is formed between the two second weld metal layers 201 and 201. In this example, enough residual stress was produced in spite of the fact that the ratio of the second weld metal to all the weld metals was not so high. In this example, the proportion of the distance d between the surface of the first weld metal layer and the second weld metal layer to the thickness t$_7$ of the plate (d/t$_7$×100) was 5%.

FIG. 7a shows compressive stress produced in the butt weld of the V-type (included angle=60°) shown in FIG. 7b in which the proportion of the depth d from the surface of a first weld metal layer 241 to a second weld metal layer 231 to the thickness t$_8$ of the plates was 10%.

FIG. 8a shows compressive stress produced in the butt weld of the I-type shown in FIG. 8b in which 261 designates first weld metal layers and 251 designates second weld metal layers. The first and second weld metal layers were arranged symmetrically thicknesswise of the plates. In this example, the proportion of the depth d from the surface of a first weld metal layer 261 to the second weld metal layer 251 to the thickness t$_9$ of the plates was 5% (o), 10% (Δ) and 15% (x). In this example, it was possible to cause compressive stress to be produced on the surface of the first weld metal layer although the proportion of the second weld metal layer to the thickness of the plates was not large.

FIG. 9a shows compressive stress produced in the butt weld shown in FIG. 9b in which the weld metal layers of the weld are asymmetrical thicknesswise of the plates, so that the compressive stress produced was lower than in welded structures of other weld metal layer of symmetrical patterns. In this example, the proportion of the depth d from the surface of a first weld metal layer 281 to a second weld metal layer 271 to the thickness t$_{10}$ of the plates was 10% (o), 20% (Δ) and 30% (x).

Several examples of butt welds in which the invention can have application have been described. It is to be understood that the invention is not limited to the butt welds and that the invention can also have application in T-joints and fillet welds. In the examples shown and described hereinabove, two types of weld metals have been used. It is to be understood, however, that more than three types of weld metals can be used in suitable combination without departing from the scope of the invention.

What is claimed is:

1. A welded structure with compressive stress on the surface of its weld produced by stress relief annealing treatment, comprising:

structural members welded by at least one weld joint into said welded structure and thereafter annealed;

a plurality of weld metals deposited on said structural members in a zone defining said weld joint of said welded structure in such a manner that the weld metals are restrained by the structural members;

said plurality of weld metals comprising a first weld metal having a first coefficient of thermal expansion forming at least one layer and a second weld metal having a second coefficient of thermal expansion higher than said first coefficient of thermal expansion forming at least a second layer, said first weld metal and said second weld metal being contiguous to each other and fused into the welded portion of said welded structure to provide a metallurgical bond, the layer of said first weld metal having an exposed surface;

said coefficient of thermal expansion of said first weld metal layer being lower than that of said second weld metal layer by over $1\times10^{-6}/°C.$; and the ratio of the thickness, as measured perpendicular to said surface, of said second weld metal to the thickness of said weld joint and the difference between said first and second coefficient of thermal expansion being sufficient that said exposed surface has compressive stress after annealing.

2. A welded structure as claimed in claim 1, wherein said welded portion comprises a butt weld.

3. A welded structure as claimed in claim 2, wherein said butt weld is one of the group of types including I-, U-, V-, K-, X- and Y-types.

4. A welded structure as claimed in claim 1, wherein said welded portion comprises at least one of the group of materials consisting of low alloy steel, carbon steel and high alloy steel.

5. A welded structure as claimed in claim 1, wherein said first weld metal is substantially the same material as said welded portion.

6. A welded structure comprising:
structural members welded by at least one weld joint into said welded structure; and a plurality of weld metals deposited in a gap defining said weld joint of said welded structure for butt welding comprising a first weld metal forming at least one layer, and a second weld metal of higher coefficient of thermal expansion than said first weld metal forming at least a second layer, said first and second weld metal layers being metallurgically bonded together and fused into said structural members in said gap defined therebetween to provide a metallurgical bond in such a manner that the weld metals are restrained in said gap, said first weld metal layer having an exposed surface having compressive stress present thereof, and said coefficient of thermal expansion of said first weld metal layer being lower than that of said second weld metal layer by over $1 \times 10^{-6}/°C$.

7. A welded structure as claimed in claim 6 wherein said first weld metal is substantially the same material as said structural members.

8. A welded structure comprising:
structural members of alloy steel welded by at least one weld joint into said weld structure; and
a plurality of weld metals deposited in a gap defining said weld joint of said welded structure to form a butt weld of symmetrical configuration comprising a first weld metal forming at least one layer, and a second weld metal higher in coefficient of thermal expansion than said first weld metal by over $1 \times 10^{-6}/°C$. forming at least a second layer, said first and second weld metal layers being metallurgically bonded together and fused into said structural members in said gap defined therebetween to provide a metallurgical bond in the form of said butt weld in such a manner that said first weld metal and said second weld metal are restrained by said welded portion, said first weld metal layer including an exposed surface having compressive stress present thereon.

9. A welded structure as claimed in claim 6 or 8, wherein the coefficient of thermal expansion of said first weld metal layer is lower than that of said second weld metal layer by over $2 \times 10^{-6}/°C$.

10. A method for making a welded structure comprising the steps of:
depositing a first weld metal and a second weld metal in contiguous layers in a gap defined by structural members to be welded into said welded structure in such a manner that a layer of said first weld metal has an exposed surface in said welded structure, said first weld metal having a lower coefficient of thermal expansion than said second weld metal by over $1 \times 10^{-6}/°C$.; and
subjecting said welded structure to stress relief annealing treatment to produce compressive stress on the exposed surface of said weld metal.

11. A method for making a welded structure comprising the steps of:
depositing a first weld metal and a second weld metal in contiguous layers in a gap defined by structural members to be welded into said welded structure in such a manner that a layer of said first weld metal has an exposed surface in said welded structure, said first weld metal having a lower coefficient of thermal expansion than said second weld metal by over $1 \times 10^{-6}/°C$.; and
subjecting said welded structure to stress relief annealing treatment by means of keeping it at the transformation point of the material forming the welded portion and thereafter slowly cooling it.

12. A method for forming a welded structure suitable for producing compressive stress on the surface of its weld by stress release annealing treatment comprising:
providing structural members to be welded into said welded structure; and
depositing a plurality of weld metals on said structural members in a zone defined by a welded portion of said welded structure in such a manner that the weld metals are restrained by the welded portion; characterized in that:
said depositing provides said plurality of weld metals to comprise a first weld metal of lower coefficient of thermal expansion forming at least one layer and a second weld metal of higher coefficient of thermal expansion forming at least one layer, with said first weld metal and said second weld metal being contiguous to each other and fused into the welded portion of said welded structure to provide a metallurgical bond, the layer of said first weld metal having an exposed surface, and said coefficient of thermal expansion of said first weld metal layer being lower than that of said second weld metal layer by over $1 \times 10^{-6}/°C$.

* * * * *